R. H. SPRINGSTEAD.
Seed Planter.
No. 6,605.
Patented July 24, 1849.
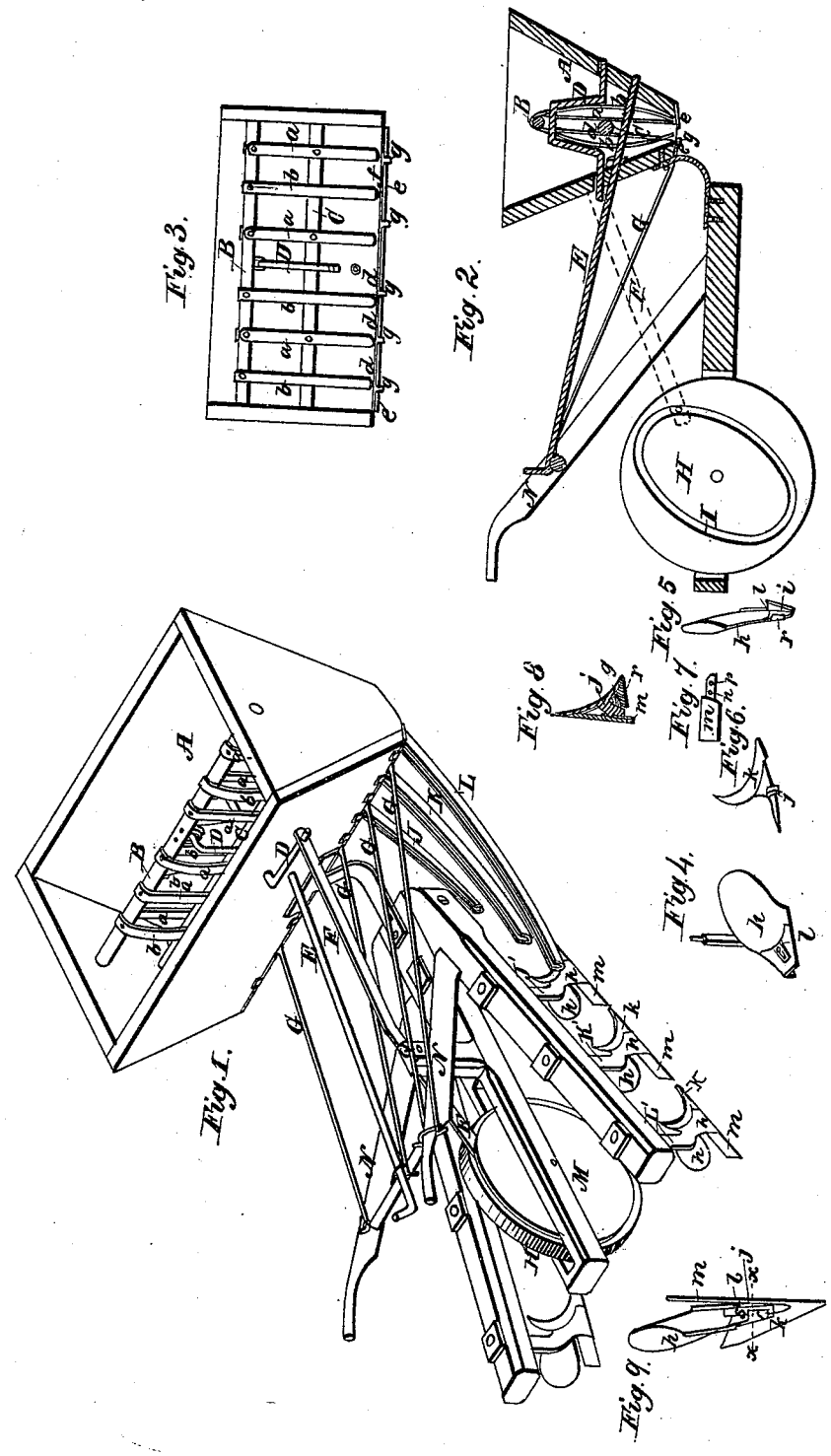

UNITED STATES PATENT OFFICE.

R. H. SPRINGSTEAD, OF WOOSTER, OHIO.

IMPROVEMENT IN SEED-PLANTERS.

Specification forming part of Letters Patent No. 6,605, dated July 24, 1849.

*To all whom it may concern:*

Be it known that I, R. H. SPRINGSTEAD, of Wooster, in the county of Wayne and State of Ohio, have invented a new and Improved Combined Cultivator and Seed or Grain Planter; and I do hereby declare the following to be a full, clear, and exact description thereof, reference being had to the accompanying drawings, making a part of this specification, in which—

Figure 1 is a perspective view of the entire machine; Fig. 2, a longitudinal vertical section thereof; and Fig. 3, an elevation of the grain-box as seen from the front, with its front side removed. Figs. 4, 5, 6, 7, 8, and 9 represent my improved manner of constructing the cultivating and planting plows made use of in my improved cultivating and planting machine.

Similar letters indicate corresponding parts in all the figures.

The general arrangement and combination of the respective parts of my improved cultivating and planting machine are clearly shown in Figs. 1 and 2 of the accompanying drawings.

The front side, A, of the grain-box fits accurately between the ends thereof, and is suspended by and works upon pins projecting from its upper corners into apertures in the ends of the box. A plate, c, is secured to the lower edge of A, and projects inward under the grain-box, as shown in Fig. 2. The aperture in the bottom of the grain-box for the discharge of the grain therefrom extends continuously the entire length of the box, and can be increased or diminished in width by operating upon the movable front side, A, thereof by means of the rod E, passing from the handles N N forward through the grain-box, and having a screw cut upon its front end which works in a screw-aperture in A, as shown in Fig. 2.

I also make use of a series of gates, $d\ d$, in combination with the movable side A of the grain-box, and the inclined open troughs or spouts J K L, for more perfectly regulating the discharge of the grain or seeds when it is to be planted in rows. The inclined conducting-troughs J K L, which communicate with the aperture in the bottom of the grain-box, extend rearward and discharge their contents in front of each of the plows J' K' L', which plow in and cover the grain or seeds. My object in making use of open troughs or conductors for conveying the grain or seeds from the grain-box to the ground is to enable the person operating the machine to see whether a uniform and proper quantity is discharged by each conductor, and, if not, to regulate the inequality by means of the gates $d\ d$, one of which is placed over the mouth of each trough, and is operated by means of the rods G G, extending back to the handles of the machine.

To insure a uniform discharge of the grain or seeds throughout the entire length of the discharging aperture in the grain-box, I insert therein a stirring apparatus, which thoroughly loosens and opens the grain in the box above the discharging aperture. The stirring apparatus is composed of the permanent bar C, running through the center of the grain-box, the reciprocating bar B above and parallel with C, (working in apertures in the ends of the box,) the series of vertical reciprocating stirrers $b\ b$, secured to the bar B, and the series of vibrating stirrers $a\ a$, jointed to the bars B and C, as represented in Figs. 1 and 3. The series of stirrers $b\ b$ are permanently secured to the reciprocating bar B. The series of stirrers $a\ a$ are jointed at their upper ends to the bar B, and at or near their centers to the bar C. Each vibrating stirrer $a$ is placed opposite to a reciprocating stirrer, $b$, consequently when the bar B is reciprocated back and forth the lower ends of the stirrers $a$ and $b$ will move in opposite directions, passing each other at their centers of motion, thereby effectually and uniformly loosening the grain or seeds above the discharging-aperture of the grain-box. The bar B is reciprocated by means of the two-throw crank D, having its bearings in the sides of the grain-box, the vibrating bar F working on a fulcrum-pin inserted into the standard Q (rising from the cultivator-frame) and the cam-groove I in the side of the wheel H, combined with each other, as shown in Figs. 1 and 2.

For sowing broadcast I detach the series of inclined conducting-troughs J K L from the grain-box, and make use of but two gates, $f$, Fig. 3, each one extending from the center to the extremities of the aperture in the grain-box for the purpose of preventing the discharge of grain from either end of the grain-box whenever it may be necessary in passing around stumps or other obstructions. The series of gates are supported and slide upon the plate or bar $e$, secured to the lower edge of the rear side of the grain-box. Each gate has a hook,

*g*, descending from its front end, that prevents its being drawn off from its supporting-plate *e*.

I improve and simplify the construction of the cultivating and planting plow made use of in my machine by making it of only three pieces, *h k m*, and uniting and securing them to each other by a wedge, *s*, as shown in Figs. 8 and 9.

Figs. 4 and 5 represent the mold-board, standard, and part of the landside in one piece, *h*. Fig. 6 represents the point *k*, and Fig. 7 the movable portion of the landside *m*. The landside-piece *m* has a shank projecting from its front end, in which are two apertures, *n* and *p*. The shank of *m* passes within and accurately fits against the inner side of the landside portion of *h*, as shown in Fig. 9. A lug, *j*, is cast upon the inner side of the point *k*, from which projects a pin, as shown in Fig. 6. When the point *k* is placed upon the mold-board, the lug *j* passes into the aperture *i* in the same. (Shown in Fig. 4.) *l* is a pin projecting from the inner side of the landside portion of *h* near the aperture *i*, as shown in Fig. 4. When the shank on the front end of *m* is inserted into its place within *h*, as shown in Fig. 9, the pin *l* passes into the aperture *p* in the same, and the pin projecting from the lug *j* (of the point) passes into the aperture *n*. The wedge *s* is then inserted under the lug *r* on the under side of *h*, (shown in Figs. 8 and 9,) which bears against the lug *j* (of the point) and presses it against the shank of *m*, and thereby securely retains the landside, point, and mold-board to each other.

What I claim as my invention, and desire to secure by Letters Patent, is—

1. The making use of open inclined conductors J K L, for conveying the grain or seeds from the grain-box to the ground, when combined with the series of gates *d d*, and the movable adjustable side of the grain-box for regulating and governing the discharge of the seeds or grain therefrom, substantially as herein represented and described.

2. The manner of arranging and combining the series of reciprocating and vibrating stirrers *b* and *a* with each other within the grain-box, substantially in the manner and for the purpose herein represented and set forth.

3. The combination of the reciprocating and vibrating stirrers *b* and *a* with the continuous discharging-aperture in the grain-box, and the regulating-gates *d d*, connected therewith and with the series of inclined open seed or grain conductors J K L, substantially in the manner herein set forth.

R. H. SPRINGSTEAD.

Witnesses:
    Z. C. ROBBINS,
    L. W. COLVER.